（12) United States Patent
Gordon-Ingram et al.

(10) Patent No.: US 8,742,956 B2
(45) Date of Patent: Jun. 3, 2014

(54) POSITION ENCODER APPARATUS

(75) Inventors: Iain R. Gordon-Ingram, Marshfield (GB); Andrew P. Gribble, Bristol (GB); Simon E. McAdam, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 16 days.

(21) Appl. No.: 13/259,683

(22) PCT Filed: Apr. 8, 2010

(86) PCT No.: PCT/GB2010/000716
§ 371 (c)(1),
(2), (4) Date: Sep. 23, 2011

(87) PCT Pub. No.: WO2010/116145
PCT Pub. Date: Oct. 14, 2010

(65) Prior Publication Data
US 2012/0025066 A1  Feb. 2, 2012

(30) Foreign Application Priority Data
Apr. 8, 2009 (GB) .................................. 0906258.9

(51) Int. Cl.
*H03M 1/22* (2006.01)
(52) U.S. Cl.
USPC .................. 341/9; 341/1; 341/11; 341/13
(58) Field of Classification Search
USPC .................................................... 341/1, 9–13
See application file for complete search history.

(56) References Cited

U.S. PATENT DOCUMENTS

| | | | |
|---|---|---|---|
| 3,882,482 | A | 5/1975 | Green et al. |
| 3,916,186 | A | 10/1975 | Raser |
| 4,469,940 | A | 9/1984 | Schmitt |
| 4,469,958 | A | 9/1984 | Schmitt |
| 4,631,519 | A | 12/1986 | Johnston |
| 4,764,879 | A | 8/1988 | Campbell |
| 5,210,409 | A | 5/1993 | Rowe |
| 5,279,044 | A | 1/1994 | Bremer |
| 5,294,793 | A | 3/1994 | Schwaiger et al. |
| 5,332,895 | A | 7/1994 | Rieder et al. |
| 5,539,993 | A | 7/1996 | Kilpinen et al. |
| 5,965,879 | A | 10/1999 | Leviton |
| 6,043,768 | A | 3/2000 | Strasser et al. |

(Continued)

FOREIGN PATENT DOCUMENTS

| | | |
|---|---|---|
| CA | 2 247 353 | 9/1996 |
| CN | 1826509 A | 8/2006 |

(Continued)

OTHER PUBLICATIONS

Aug. 14, 2009 British Search Report issued in British Application No. GB 0906258.9.

(Continued)

*Primary Examiner* — Khai M Nguyen
(74) *Attorney, Agent, or Firm* — Oliff PLC

(57) ABSTRACT

A position encoder kit, including: a scale comprising a series of position features; and a readhead. The readhead includes a detector for receiving configuration information from a configuration item. The readhead is configured to operate in accordance with the configuration information. The readhead also includes a receiver interface via which the readhead can supply position information to a receiver.

21 Claims, 4 Drawing Sheets

(56) References Cited

U.S. PATENT DOCUMENTS

| | | | |
|---|---|---|---|
| 6,438,860 B1 | 8/2002 | Glimm | |
| 6,483,104 B1 | 11/2002 | Benz et al. | |
| 6,636,354 B1 | 10/2003 | D'Hooge et al. | |
| 6,867,412 B2 | 3/2005 | Patzwald et al. | |
| 6,927,704 B1* | 8/2005 | Rouleau | 341/13 |
| 7,180,430 B2* | 2/2007 | Ng et al. | 341/13 |
| 7,227,124 B2 | 6/2007 | Altendorf | |
| 7,289,042 B2 | 10/2007 | Gordon-Ingram | |
| 7,550,710 B2 | 6/2009 | McAdam | |
| 7,763,875 B2 | 7/2010 | Romanov et al. | |
| 2003/0145479 A1 | 8/2003 | Mayer et al. | |
| 2005/0133705 A1 | 6/2005 | Hare et al. | |
| 2006/0284062 A1 | 12/2006 | Altendorf | |
| 2007/0051884 A1 | 3/2007 | Romanov et al. | |
| 2008/0013105 A1 | 1/2008 | McMurtry et al. | |
| 2010/0134790 A1 | 6/2010 | Vokinger et al. | |

FOREIGN PATENT DOCUMENTS

| | | |
|---|---|---|
| CN | 1896695 A | 1/2007 |
| CN | 1973184 A | 5/2007 |
| DE | 34 27 067 A1 | 2/1985 |
| DE | 39 36 452 A1 | 5/1991 |
| DE | 44 36 784 A1 | 4/1995 |
| DE | 44 03 218 A1 | 5/1995 |
| DE | 43 41 767 C1 | 6/1995 |
| DE | 196 38 912 A1 | 3/1998 |
| DE | 100 25 760 A1 | 12/2001 |
| EP | 0 207 121 B1 | 1/1990 |
| EP | 1 420 229 A1 | 5/2004 |
| EP | 1 775 559 A1 | 4/2007 |
| EP | 1 995 567 A1 | 11/2008 |
| GB | 2 353 421 A | 2/2001 |
| JP | A-60-231111 | 11/1985 |
| JP | A-01-250820 | 10/1989 |
| JP | A-06-148098 | 5/1994 |
| JP | A-09-113313 | 5/1997 |
| JP | A-09-311052 | 12/1997 |
| JP | A-2001-074507 | 3/2001 |
| JP | A-2002-354835 | 12/2002 |
| JP | A-2003-141673 | 5/2003 |
| JP | A-2005-337757 | 12/2005 |
| JP | A-2006-038569 | 2/2006 |
| JP | A-2006-170790 | 6/2006 |
| WO | WO 01/89966 A1 | 11/2001 |
| WO | WO 02/084223 A1 | 10/2002 |
| WO | WO 03/061891 A2 | 7/2003 |
| WO | WO 2004/094957 A1 | 11/2004 |
| WO | WO 2005/124282 A2 | 12/2005 |
| WO | WO 2006/003452 A2 | 1/2006 |
| WO | WO 2006/010954 A1 | 2/2006 |
| WO | WO 2006/120440 A1 | 11/2006 |
| WO | WO 2007/030731 A2 | 3/2007 |
| WO | WO 2009/053719 A2 | 4/2009 |

OTHER PUBLICATIONS

Nov. 3, 2010 International Search Report issued in Application No. PCT/GB2010/000716.

Nov. 3, 2010 Written Opinion of the International Searching Authority issued in Application No. PCT/GB2010/000716.

Renishaw, PLC, "RGH26 serial linear encoder system," http://www.renishaw.com/en/rgh26-serial-linear-encoder-system--6446, May 17, 2012, pp. 1-4.

"Technical Support Package—Absolute Position Encoders With Vertical Image Binning," NASA Tech Briefs GSC-14633-1, pp. 1-5, National Aeronautics and Space Administration, Greenbelt, Maryland.

Denic et al., "High-Resolution Pseudorandom Encoder with Parallel Code Reading," *Elektronika Ir Elektrotechnika*, 2004, pp. 14-18, vol. 7, No. 56, Aukstuju Dazniu Technologija, Mikrobangos.

U.S. Appl. No. 13/257,622, filed Sep. 20, 2011 in the name of Gordan-Ingram et al.

International Search Report issued in International Application No. PCT/GB2010/000714 dated Oct. 5, 2010.

Written Opinion issued in International Application No. PCT/GB2010/000714 dated Oct. 5, 2010.

Search Report issued in British Patent Application No. GB0906257.1 dated Sep. 1, 2009.

Jun. 27, 2013 Office Action issued in Chinese Patent Application No. 201080015769.0 (with translation).

Aug. 20, 2013 Office Action issued in Japanese Patent Application No. 2012-504072 (with translation).

Oct. 15, 2013 Official Notice of Rejection issued in Japanese Patent Application No. 2012-504071 (with translation).

Oct. 30, 2013 Office Action issued in Chinese Patent Application No. 201080015768.6 (with translation).

Dec. 17, 2013 Notice of Final Decision of Rejection issued in Japanese Patent Application No. 2012-504072 (with translation).

Jan. 20, 2014 Office Action issued in Chinese Patent Application No. 201080015769.0 (with translation).

English-language Translation of Japanese Publication No. H01-250820 dated Oct. 5, 1989.

Mar. 21, 2014 Office Action issued in U.S. Appl. No. 13/257,622.

\* cited by examiner

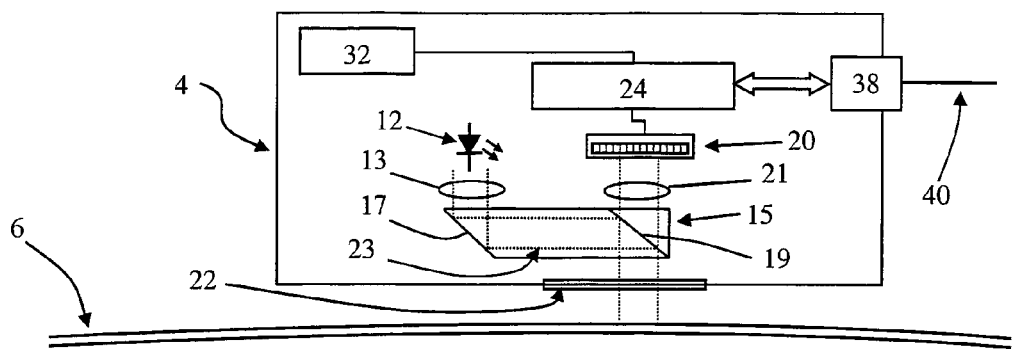
Fig 3b
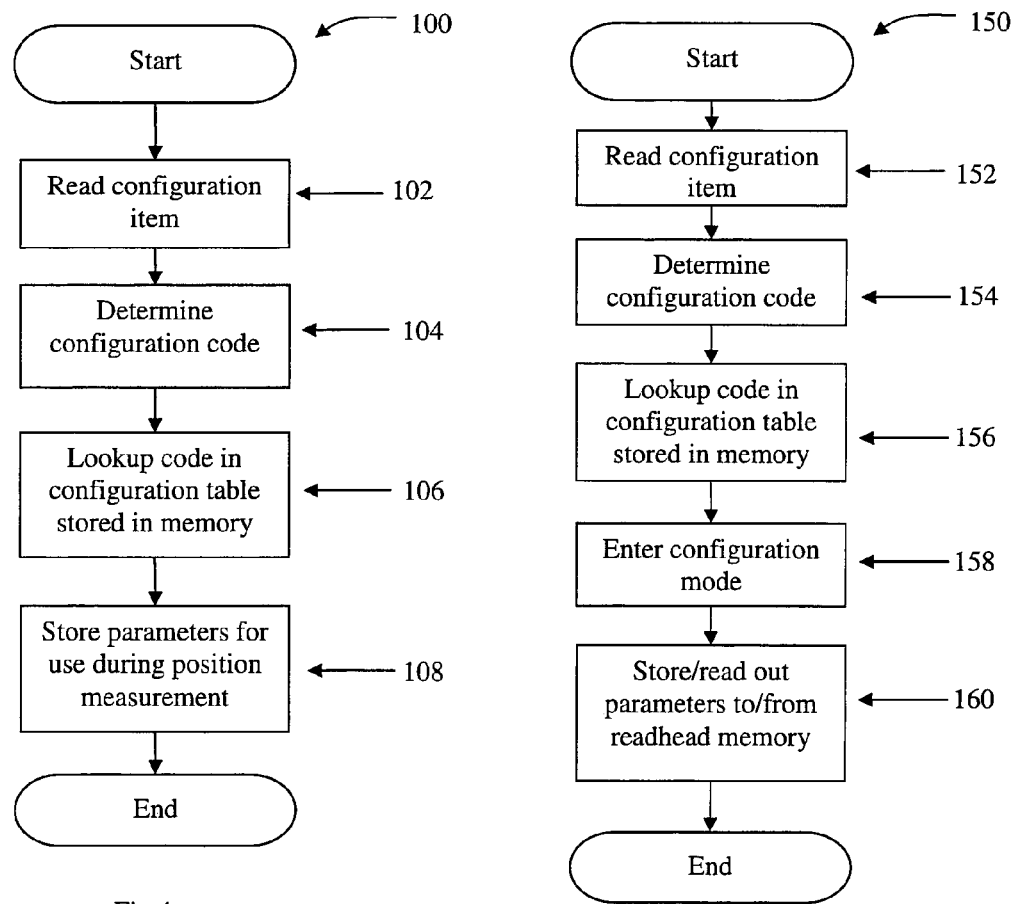
Fig 4a
Fig 4b

POSITION ENCODER APPARATUS

This invention relates to a position encoder apparatus and a method of operating a position encoder.

Position encoders for measuring the relative position between two moveable objects are well known. Typically, a series of scale markings are provided on one object and a readhead for reading the scale markings on another. The scale markings can be formed integrally with the object or can be provided on a scale which can be secured to the object.

There are many different types of scale available, including ring scales which enable the relative rotational position between two objects to be measured and linear scales which enable the translational position to be measured. Also, scales are available in different sizes. For instance, manufacturers often provide a number of ring scales having different diameters.

A position encoder is commonly categorised as being either an incremental position encoder or an absolute position encoder. In an incremental position encoder the scale has a plurality of periodic markings which can be detected by the readhead so as to provide an incremental up/down count. For instance, such a scale is described in European Patent Application no. 0207121. Reference marks can be provided, either next to or embedded in the periodic markings so as to define reference points. For example, such a scale is disclosed in Published International Patent Application WO 2005/124282. An absolute position encoder typically measures relative displacement by a readhead detecting unique series of marks, e.g. codes, and translating those series of marks into an absolute position. Such a scale is disclosed in International Patent Application no. PCT/GB2002/001629.

Reconfigurable position encoders are known and are for instance described in U.S. Pat. No. 6,043,768. In order to reconfigure the readhead the user connects the readhead to a computer via the readhead's controller position communication link and sends reconfiguration data to and from the readhead via that link.

This invention provides an improved configurable position encoder.

In accordance with a first aspect of the invention there is provided a position encoder kit, comprising: a scale comprising a series of position features; and a readhead comprising a detector for receiving configuration information from a configuration item, the readhead being configured to operate in accordance with the configuration information, and a receiver interface via which the readhead can supply position information to a receiver.

Accordingly, the readhead can be reconfigured by it receiving the configuration information from the configuration item. As the detector is separate to the receiver interface then receipt of the configuration information does not need to interfere with communications between the readhead and receiver, thereby simplifying the communications protocol between the readhead and receiver. It has also been found that the provision of a configuration item from which the readhead can receive configuration information gives rise to increased readhead reconfigurability, and makes the provision of a single type of readhead for use with multiple scale types a much more realistic and viable option. Also, as will be described in more detail below, reconfiguring the readhead using the present invention can enable reconfiguration of the readhead to be much more user friendly, error proof, and even automatic and seamless.

As will be understood, the receiver could be a controller which uses the position information in a control process, for instance to control the operation of a machine. Optionally, the receiver could simply store the position information (for instance if the encoder were be used in a monitoring/recording situation) and/or forward the position information to a further device for processing.

The readhead could be configured to switch between different modes of operation in accordance with the configuration information. For instance, the readhead could be configured to operate either in a calibration mode or reading mode dependent on the configuration information. In another embodiment, the readhead could be configured to operate in at least one of a plurality of different modes. These modes could comprise a reading mode, and at least one of a calibration mode and a configuration mode. The calibration mode could comprise performing various calibration operations, such as for example, automatically adjusting the LED intensity to compensate for scale reflectivity. The configuration mode could be a mode which enables an external processor device to reconfigure the readhead. The external processor device could be the receiver. Optionally, the external processor device could be a device separate to the receiver. In particular, the configuration mode could be a mode which enables an external processor device to access a memory device in the readhead, so as to store and/or retrieve data stored in the memory device. Such data could comprise for example, readhead setup data such as lookup tables for decoding absolute position data, readhead operating software (or FPGA configuration information), and/or readhead status information (e.g. signal size, or scale cleanliness information). The readhead could communicate with an external processor device via an interface separate to the receiver interface. Preferably, the readhead and external processor device can communicate via the receiver interface. In particular, preferably, the readhead and external processor device communicate via the same data lines via which position information is supplied to the receiver. Accordingly, the configuration information could be used to put the readhead into a mode which enables the readhead to communicate with a processor device (for example via the receiver interface) so as to exchange data other than position information.

Optionally, the readhead could be configured to process readings of the scale's position features in accordance with the configuration information. The readhead could be configured such that the output format of position information is based on the configuration information. The readhead could be configured such that the degree of resolution of the position information is based on the configuration information.

The configuration information could identify the scale type. This could then be used by the readhead to determine how to process readings of the scale's position features and/or format the output of position information. For instance, the readhead could be preconfigured to operate in a different manner depending on the scale type that it is to be used with. The configuration information could comprise instructions on how the readhead should process readings of the scale's position features and/or format the output of position information.

The kit can further comprise a configuration item comprising the configuration information. In this case the configuration item can comprise an article having at least one attribute detectable by the detector which encodes the configuration information. The attribute could be any suitable physical attribute. For instance, the configuration item could comprise an article having a particular optical magnetic, capacitive or inductive property that is detectable by the detector. For example, the configuration item could comprise an article having a particular shape, size, colour, or magnetic strength, magnetic polarity or optical polarisation. Optionally, the configuration item comprises an article having a plurality of features detectable by the detector which encodes the configuration item. Particular examples of suitable features include optical features, magnetic features, capacitive features or inductive features. For example, the configuration article could comprise of series of markings encoding configuration information. The features could encode a code which can be used by the readhead to reconfigure itself. The code could be a binary code, for instance. The code could be used by the readhead as a reference for an entry in a lookup table. The code could comprise data useable by the readhead to reconfigure itself.

Conveniently, the configuration article and the scale can be separate components. Optionally, the scale comprises the configuration article. In this case, the configuration article could be placed remote to the scale's series of position features. For instance, the configuration article could comprise at least one attribute that is located on the underside of the scale, on the side of the scale, or on the same side of the scale as the series of position features but adjacent to the series of position features, e.g. in a different track. It is known for scales, and, in particular for incremental scales, to have at least one track adjacent to the track containing the position features. Such a track can contain at least one reference or limit mark which can be detected by the readhead so as to identify a reference or limit position. The configuration article could be provided in a track adjacent the position features, for instance in a reference or limit track. In this case, the detector for receiving configuration information could also be used to detect reference and/or limit marks in use.

If desired, the series of position features and the configuration article can be contained within a common track. Accordingly, the configuration article can be embedded within the series of position features. In this case, the configuration article and series of position features could share at least one common feature. In particular, the series of position features could comprise the configuration article. In other words, the configuration article could provide position information readable by the readhead. Optionally, at least a plurality of position features, and optionally each position feature, could comprise a configuration article. For instance, in an absolute encoder in which position information is encoded in the form of codewords, one or more codewords, at least two codewords, optionally at least half the codewords, and for instance substantially all the codewords, could comprise a configuration article. In other words, codewords that also comprise a configuration article can be read by the readhead to obtain relative position information and also can be used to identify how the readhead should operate.

Optionally, the configuration item comprises a configuration device operable to transmit configuration information for receipt by the detector. Accordingly, the configuration item could comprise a transmitter. The transmitter could be a wireless transmitter. The transmitter could be an optical transmitter. As will be understood, this can include transmitters suitable for transmitting electromagnetic radiation (EMR) in the infrared to ultraviolet range. For instance, the transmitter could be a source of visible EMR. The configuration item could comprise a processor configured to control the transmitter so as to transmit the configuration information. The configuration device can comprise at least one set of configuration data stored thereon and can be operable to selectively transmit at least one set of configuration data to the readhead.

The readhead can have a reading face which during use faces the scale's series of position features so that the readhead can read the series of position features. The reading face can comprise a reading region adjacent which the scale's series of position features must be located in order for the readhead to read the series of position features. The readhead could be configured to receive the configuration information via a different face. Preferably, the readhead is configured to receive the configuration information via its reading face. Optionally, the readhead is configured such that the configuration item must be positioned adjacent the same reading region in order for the detector to detect the configuration information. For instance, in the case of an optical encoder apparatus, the readhead will likely include a reading window for receiving light from the scale. In this case, the readhead can be configured such that the configuration item must be positioned adjacent the same reading window in order for the detector to detect the configuration information. The readhead's detector for receiving configuration information can also be for reading the scale's series of position features.

The position encoder kit can be a magnetic or inductive position encoder kit. The position encoder kit can be a capacitive position encoder kit. Optionally, the position encoder kit is an optical position encoder kit. In this case, the position encoder kit could be transmissive in which the readhead detects light transmitted through the scale. Optionally, the position encoder kit could be reflective in which the readhead detects light reflected off the scale. The readhead could comprise an optical source for illuminating the scale.

As will be understood, there are many suitable ways in which the features can be defined on a scale. For instance, features can be defined by markings having particular electromagnetic radiation (EMR) properties, for example particular optical properties, for instance by the particular optical transmissivity or reflectivity of parts of the scale. Accordingly, a feature could for example be defined by parts of the scale having a minimum reflectivity or transmissivity value. Optionally, a feature could for example be defined by parts of the scale having a maximum reflectivity or transmissivity value. In the case of a magnetic encoder, features can be defined by markings having particular magnetic properties or for instance by the presence or absence of ferromagnetic material. In the case of capacitive scale features can be defined by markings having particular capacitive properties.

The features can take the form of lines, dots or other configurations which can be read by a readhead. Preferred configurations for one-dimensional scales can comprise lines extending across the entire width of a track in a dimension perpendicular to the measuring dimension.

According to a second aspect of the invention there is provided a readhead for reading position features on a scale in order to facilitate relative position measurement between the two, the readhead comprising a detector for receiving configuration information from a configuration item, the readhead being configured to operate in accordance with the configuration information, and a receiver interface via which the readhead can supply the position information to a receiver.

According to a third aspect of the invention there is provided a configuration item comprising configuration information for configuring a readhead to operate in accordance with the configuration information.

According to a fourth aspect of the invention there is provided a scale comprising a series of position features for reading by a readhead to determine its position relative to the scale, the scale comprising configuration information for configuring the readhead to operate in accordance with the configuration information.

According to a fifth aspect of the invention there is provided a method of operating a readhead for reading position features on a scale comprising a detector for receiving configuration information from a configuration item, the readhead being configured to operate in accordance with the configuration information, and a receiver interface via which the readhead can supply position information to a receiver.

According to a sixth aspect of the invention there is provided a position encoder kit, comprising: a scale comprising a series of position features; and a readhead comprising a detector for receiving configuration information from a configuration item, the readhead being configured to operate in accordance with the configuration information, in which the readhead has a reading face which during reading of the series of position features faces the scale's series of position features, and in which the readhead is configured to receive the configuration information via its reading face.

Embodiments of the invention will now be described, by way of example only, with reference to the following drawings in which:

FIG. 3b is a schematic block diagram of the various optical and electronic components of the readhead according to a second embodiment;

FIG. 4a illustrates a configuration process used by the readhead;

FIG. 4b illustrates a process in which the readhead is used in a configuration mode;

Figure 1:
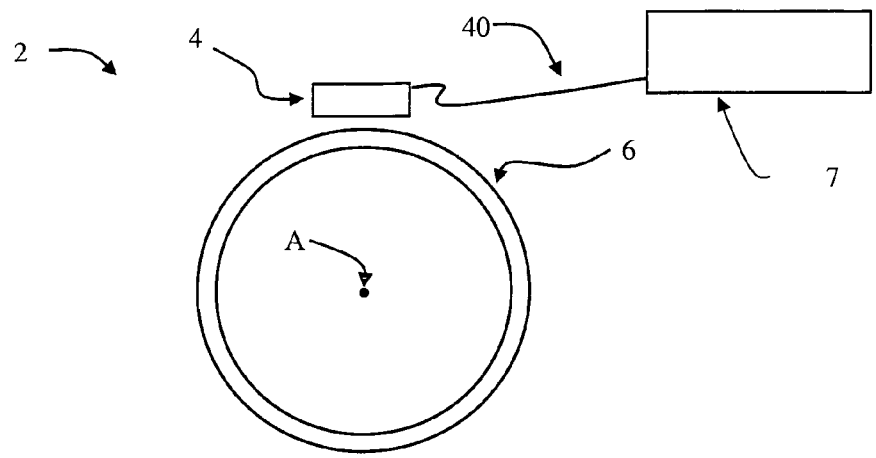
FIG. 1 is a schematic side view of an encoder apparatus according to the invention comprising a ring scale and a readhead.

Referring to FIGS. 1, 2, 3a and 3b there is shown an encoder apparatus 2 comprising a readhead 4, scale 6 and controller 7. The readhead 4 and scale 6 are mounted to first and second objects respectively (not shown). The scale 6 is rotatable about axis A (which extends perpendicular to the page as shown in FIG. 1) relative to the readhead. In the embodiment described, the scale 6 is a rotary scale. However, it will be understood that the scale 6 could be a non-rotary scale, such as a linear scale. Furthermore, the scale 6 enables measurement in a single dimension only. However, it will be understood that this need not be the case, and for example the scale could enable measurement in two dimensions.

In the described embodiment, the scale 6 is an absolute scale and comprises a series of reflective 8 and non-reflective 10 lines arranged to encode unique position data along its length. As will be understood, the data can be in the form of, for instance, a pseudorandom sequence or discrete codewords.

The width of the lines depends on the required positional resolution and typically in the range of 1 µm to 100 µm, and more typically in the range of 5 µm to 50 µm. In the described embodiment, the width of the lines is in the order of 15 µm. The reflective 8 and non-reflective 10 lines are generally arranged in an alternate manner at a predetermined period. However, select non-reflective lines 10 are missing from the scale 6 so as to encode absolute position data in the scale 6. For instance, the presence of a non-reflective line can be used to represent a "1" bit and the absence of a non-reflective line can represent a "0" bit. A series of groups of markings can be used to encode a series of unique binary codewords along the scale length defining unique, i.e. absolute, position information. Further details of such a so-called hybrid incremental and absolute scale is described in International Patent Application no. PCT/GB2002/001629 (publication no. WO 2002/084223), the content of which is incorporated in this specification by this reference.

As will be understood, absolute position data could be encoded in the scale 6 by missing reflective lines 8, as well as, or instead of missing non-reflective lines 10. Furthermore, absolute position data could be embedded in the scale 6 without the addition or removal of reflective 8 or non-reflective lines 10. For instance, the width of lines or the distance between them could be varied in order to embed the absolute position data in the scale 6. As will also be understood, the invention could also be used with incremental scales. In this case, if desired, reference marks could be provided either adjacent or embedded within the incremental scale track.

Figure 3A:
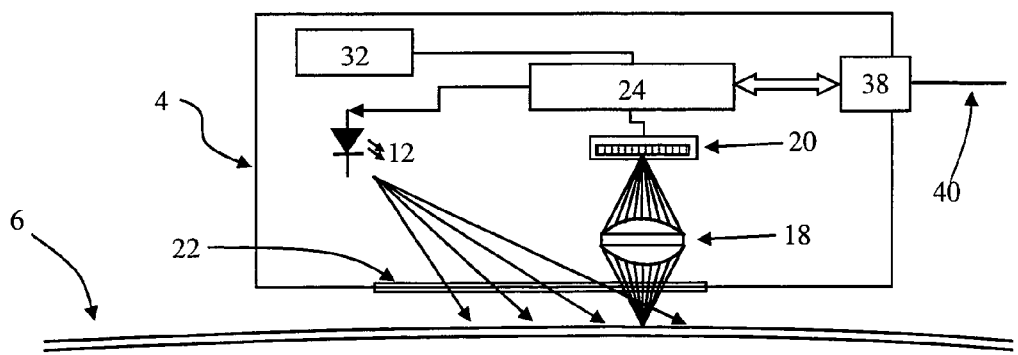
FIG. 3a is a schematic block diagram of the various optical and electronic components of the readhead according to a first embodiment.

As illustrated in FIG. 3a the readhead 4 comprises a Light Emitting Diode ("LED") 12, a lens 18, a Complementary Metal-Oxide-Semiconductor ("CMOS") image sensor 20 and a window 22. Light emitted from the LED 12 passes through the window 22 and falls on the scale 6. The scale 6 reflects the light back through the window 22 which passes through the lens 18 which in turn images the scale onto the CMOS image sensor 20 using the reflected light. Accordingly, the CMOS image sensor 20 detects an image of a part of the scale 6. The CMOS image sensor 20 comprises a single row of 256 elongate pixels whose length extend parallel to the length of the reflective 8 and non-reflective lines 10 on the scale. The embodiment shown is of the reflective type, but as will be understood, the invention can be used with transmissive type encoder apparatus (in which the light is transmitted through the scale rather than being reflected from it).

The readhead 4 also comprises a CPU 24, a memory device 32 in the form of Electrically Erasable Programmable Read-Only Memory (EEPROM) and an interface 38.

The LED 12 is connected to the CPU 24 so that the LED 12 can be operated on demand by the CPU 24. The CMOS image sensor 20 is connected to the CPU 24 such that the CPU 24 can receive an image of the intensity of light falling across the CMOS image sensor 20. The CMOS image sensor 20 is also directly connected to the CPU 24 so that the CMOS image sensor 20 can be operated to take a snapshot of intensity falling across it on demand by the CPU 24. The CPU 24 is connected to the memory 32 so that it can store and retrieve data for use in its processing. For instance, in this embodiment the memory 32 contains a plurality of lookup tables. One or more of the lookup tables will be used in the determination of the relative position of the readhead 4 and scale 6 as explained in more detail below. The interface 38 is connected to the CPU 24 so that the CPU 24 can receive demands from and output results to an external device such as a controller 7

(shown in FIG. 1) via line 40. The line 40 also comprises power lines via which the readhead 4 is powered.

The readhead illustrated in 3b is substantially the same as that illustrated in 3a and like parts share like reference numerals. However, the optical arrangement of the embodiment shown in FIG. 3b is slightly different. In this embodiment, the readhead 4 comprises a collimating lens 13, a beam splitter assembly 15 having a reflecting face 17 and a beam splitting face 19, and an imaging lens 21. The collimating lens 13 collimates light emitted from the LED 12 into a beam 23 which is then reflected by the splitter assembly's reflecting face 17 toward the beam splitting face 19. The beam splitting face 19 reflects the beam 23 toward the scale 6 via window 22, which then reflects the light back through the window 22 toward beam splitting face 19 which allows the reflected light to pass straight through it. The reflected light then passes through the imaging lens 21 which forms an image of the scale 6 onto the CMOS image sensor 20.

As will be understood, the scale's pattern can be formed via mechanisms other than features having different optical properties. For instance, as is well known, features having different magnetic, capacitive or inductive properties can be used to encode position information onto a scale. In these cases an appropriate magnetic, capacitive or inductive sensor arrangement will be provided in place of the lens 18, CMOS image sensor and LED in the readhead.

In use, the readhead 4 waits until a position request is received from a controller 7 via the interface 38. Once received the readhead 4 then operates under the control of the CPU 24 to determine the absolute relative position between the scale 6 and the readhead 4. This involves the CPU 24 causing a snapshot of the scale 6 to be taken by the readhead 6. This is effected by the CPU 24 controlling the LED 12 to temporarily emit light and also controlling the CMOS image sensor 20 to simultaneously sense and register the intensity of the pattern of light falling across it. The CPU 24 then analyses the image received from the CMOS image sensor in order to extract a codeword from the image. The relative position corresponding to this codeword can then either be determined by the CPU 24 (for instance by using a look-up table stored in the memory 32) and then sent to the controller 7, or the CPU 24 can simply send the codeword to the controller 7 for further processing. As will be understood, in an alternative embodiment, the raw image data obtained by the CMOS image sensor 20 could be sent straight to the controller 7 without any processing or analysis by the readhead 4.

As described below, the readhead 4 receives configuration information from a configuration item and then operates in accordance with that configuration information.

Figure 2:
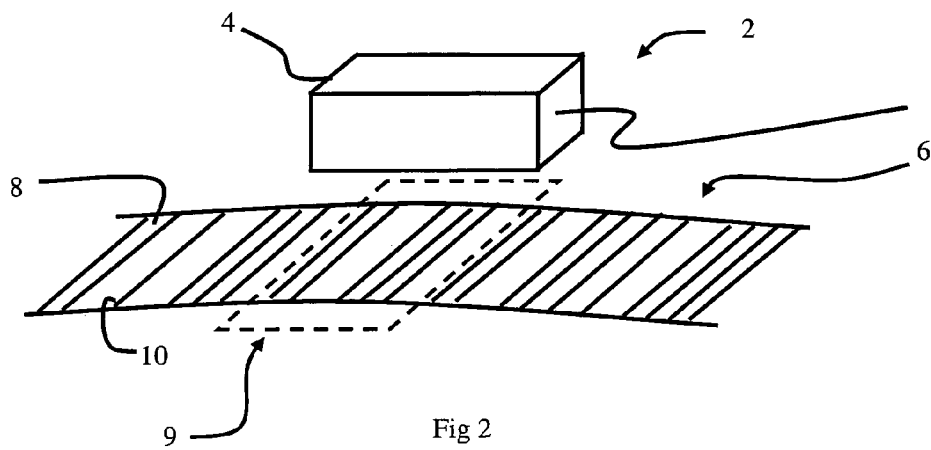
FIG. 2 is a schematic isometric view of the encoder apparatus of FIG. 1.

Continuing with the embodiment of FIGS. 1 to 3, a common readhead 4 is to be made for use with a variety of different types of absolute scale, in particular different sized ring absolute scale. Using a common readhead can be advantageous as this increases flexibility for the customer (i.e. they can swap readheads and scales) and also simplifies manufacturing and stocking of encoder apparatus. However, the readhead 4 will need to know the particular type (e.g. linear or rotary scale, and ring diameter if the scale is a rotary scale) of the scale 6 it is being used with so that it can convert its measurements into a sensible linear or angular output.

In the embodiment shown in FIGS. 1 and 2, the scale 6 is provided with a configuration item 9 highlighted in FIG. 2 by the dashed box. In this case, the configuration item 9 comprises a series of markings defining a configuration code. The configuration code is specific to the particular type of the scale 6. As shown, the configuration item 9 is embedded within the absolute position data on the scale's 6 surface. Furthermore, the configuration item 9 also defines absolute position information.

One example method by which the readhead configures itself based on the configuration item will now be described with reference to FIG. 4a. The readhead configuration process 100 comprises at step 102 with the readhead 4 obtaining an image of the markings of the configuration item 9 and then at step 104 processing the image to determine the configuration code. The configuration code is then used at step 106 as a lookup reference to a configuration table stored in the memory 32. The entry in the configuration table corresponding to the configuration code comprises parameters which the readhead's CPU 24 can use during operation in order to properly process the position signals it reads from the scale in order to provide sensible position information to the controller. Accordingly, at step 108 the CPU 24 can store those parameters in a local memory for use during operation. Examples of the sort of parameters that the lookup table might contain include: whether the scale is a rotary or linear scale, scale size, e.g. scale length or scale diameter, scale period, scale material type (which could affect scale reflectivity). The parameters might also include other parameters which can be used during operation, such as: the output data format, whether errors and/or warnings are enabled or disabled, error and/or warning types and their parameters, communication protocol information such as the communication data rate. As will be understood, rather than, or in addition to, the configuration item 9 defining a lookup code, the configuration item 9 could directly encode parameters which the readhead's CPU 24 can store and use during operation.

In the embodiments described above the process of looking for a configuration code is operated each time the readhead 4 is powered up. However, this need not be the case. For instance, the readhead 4 could be configured such that it only looks for a configuration code on instruction from a user. Optionally, on power up the readhead 4 can be configured to take a reading of what is placed under its window 22, and if it reads a configuration item then it will reconfigure itself accordingly, otherwise it resumes with its last configuration state. Also, the readhead could check each time it takes a reading to see if there is any configuration information contained in what it has read. Accordingly, this would allow the configuration of the readhead to change depending where it is located along the scale.

Each scale 6 for use with the readhead 4 can have at least one configuration item 9 located at some point along the length of the scale 6, but have at least some codes that do not provide any configuration data—rather they only provide position information. This can be advantageous as it means that the same code patterns used to provide position information can be used across scales of different types. However, during the configuration process the readhead 4 must first find the configuration item 9. This can be done by the user setting up the readhead 4 and scale 6 so that the readhead 4 is located over the configuration item 9 on initiation of the configuration process 100. Optionally, on start up the readhead 4 and scale 6 could be manually or automatically moved relative to each other until the readhead 4 reads the configuration item 9.

In the above described embodiment, the configuration item 9 can also define absolute position information. For instance, the configuration code could be unique to a particular location on the scale and therefore provide unique, i.e. absolute, position information.

In an alternative embodiment, the scales are manufactured such that each type of scale has absolute code markings unique to that type. Accordingly, for example, an absolute code covering a given length (for instance 20 meters) can be generated. The first 10 meters of the code can be split across different sized ring scales (e.g. 157 mm of the code can be used to cover a 50 mm diameter ring scale, the next 314 mm can be used to cover a 100 mm diameter ring scale, and so on) with the last 10 meters being used for linear scale. In this case, a readhead 4 could be placed on any piece of scale at any location and from reading any codeword the readhead could identify which scale it is reading and reconfigure itself and format its position information accordingly. Accordingly, in this embodiment, every absolute code marking on a scale contains position information and also is a configuration item containing configuration data. Such an embodiment can be advantageous as it can avoid the need for relative movement between the readhead and scale in order for the readhead to find the configuration item.

In the above described example, the readhead 4 uses the configuration item to look up the parameters to use during operation. However, as will be understood, the configuration item could be used to in other ways. For instance, the configuration item could be used to select the operation mode of the readhead 4. For example, the readhead could have a reading mode in which it samples signals from the CMOS sensor 20 to determine position information (or the presence of a configuration item) and at least one other mode such as a configuration mode in which the readhead can communicate with an external processor device such as a computer via line 40, so as to enable the external processor device to store data in or retrieve data from the readhead's memory 32. The configuration item could be used to control which mode the readhead operates in. An example will be described with reference to FIG. 4b. The readhead's 4 default mode of operation could its reading mode. Accordingly, at step 152, the readhead 4 takes an image of what is placed under its reading window. In this case, a configuration item is placed which contained information to tell the readhead to change its mode of operation to the configuration mode. Accordingly, at step 154, the readhead 4 processes the image obtained at step 152 and determines what the configuration code is. At step 154, the readhead 4 uses the determined configuration code as a lookup reference to a configuration table stored in the memory 32. In this embodiment the entry in the configuration table corresponding to the configuration code contains instructions for the readhead 4 to operate in a mode in which it enables communication with an external processor device. Accordingly, at step 160, the readhead listens for commands coming down the line 40, such as commands for storing and/or retrieving data in the memory (e.g. manufacturing information (e.g. serial number), configuration information (e.g. serial protocol definition, resolution of position data to be transmitted), readhead operating software (or FPGA configuration information), and/or lookup tables for decoding absolute position information are all examples of the sort of data that might be stored and/or retrieved). These commands and the responses to them can be received and sent along the same line 40 used to report position information back to the controller during reading of the scale.

Further alternative embodiments of the invention will now be described with reference to FIGS. 5 to 11.

Figure 5:
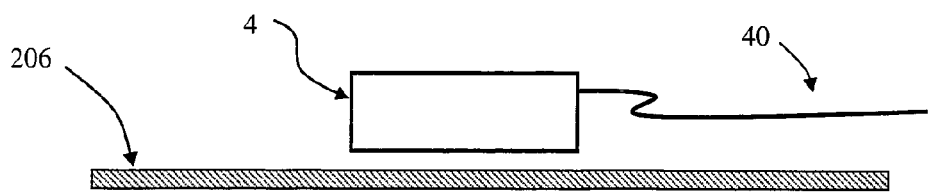
FIG. 5 is a schematic side view of an encoder apparatus according to the invention comprising a linear scale and a readhead.

With regard to FIG. 5, there is shown the readhead 4 as set up for normal operation to read the linear scale 206 so as to obtain relative position information. The linear scale 206 can comprise at least one configuration item. In the same way as the above described embodiment in connection with FIGS. 1 to 4, the configuration item can be embedded within the position information on the linear scale 206.

Figure 6:
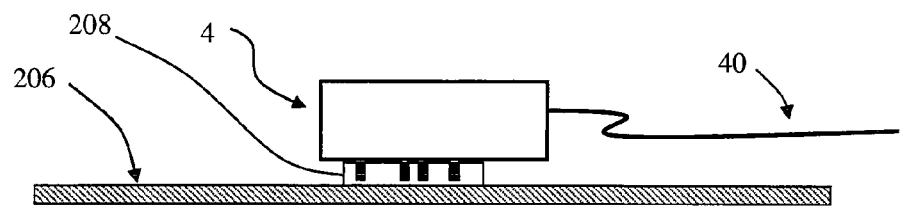
FIG. 6 illustrates another embodiment of the invention in which the readhead is configured using a configuration item that is separate to the scale.
Figure 7:
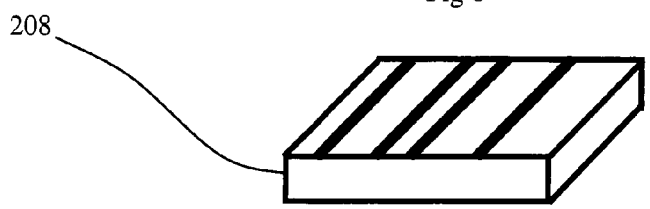
FIG. 7 shows an isometric view of the configuration item of FIG. 6.

As shown in FIGS. 6 and 7, a configuration article 208 that is separate to the scale 206 can be provided. In this embodiment the configuration article 208 comprises an object, such as a block or piece of material having features formed on it. The features can be similar to the features on the scale, i.e. of similar dimensions and formed in the same or similar way. For instance, the features could be formed using an electrochemical machining method, a laser ablation or melting technique, details of which are described in more detail in Published International Patent Applications WO 2006/010954, WO 03/061891 and WO 2006/120440. Alternatively, because typically the feature density and position requirements of the configuration article are not as tight as that of the position features, the configuration article's features could be formed using a completely different process. In particular they could be formed using a much cheaper and simpler process. For instance, inkjet technology could be used to print features onto card, paper or the like. For example, the configuration article's features could be printed on user documentation such as the user manual and/or the product packaging, such as the box in which the scale and/or readhead is supplied. Furthermore, it would be possible to supply configuration article designs electronically. For instance, a configuration article design could be supplied on a computer readable medium such as a CD-ROM or memory stick with the scale and/or readhead, downloaded via the internet, supplied via e-mail or via a multi-media message such as to a mobile telephone. The user could then print the configuration article using the design.

When using a configuration article 9 that is separate to the scale 206, then in order to reconfigure the readhead 4 the user places the separate configuration article 208 under the readhead 4 such that the readhead 4 can read the features on the configuration article. As shown in FIG. 6, the configuration article is dimensioned so that, if desired, this can be done in situ, i.e. whilst the readhead 4 and scale 206 are still mounted in an operating arrangement (as shown in FIG. 6). However, as will be understood this need not necessarily be the case.

In the embodiment of FIGS. 6 and 7, the configuration article 208 is dimensioned so that all of its features can be read without relative movement between the readhead 4 and configuration article 208. Accordingly, all of the configuration data can be read from one image of the configuration article 208. This can limit the amount of data the configuration article 208 can carry, but has been found to be sufficient when the configuration article 208 is only required to carry a few parameters or only to carry a configuration code which the readhead 4 uses as a lookup reference code.

Figure 8:
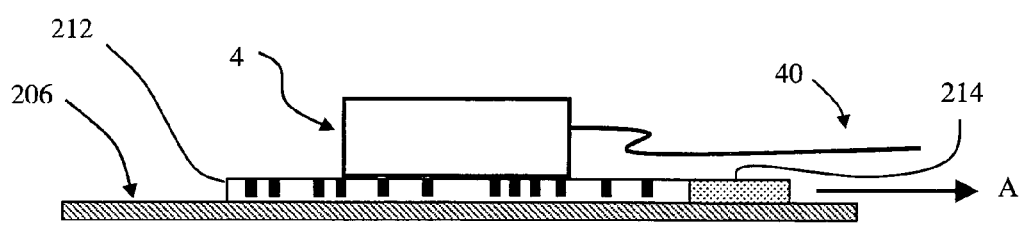
FIG. 8 shows a further embodiment of the invention in which the readhead is configured using a configuration item that is separate to the scale.
Figure 9:
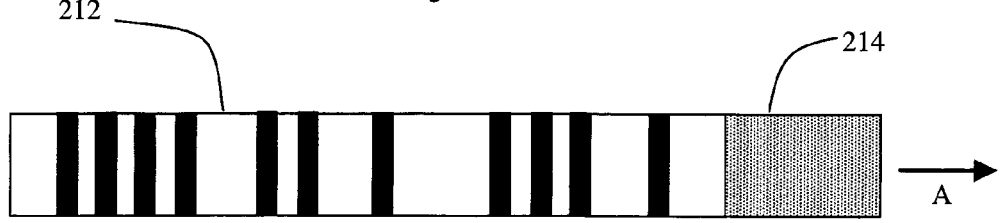
FIG. 9 shows a plan view of the configuration item of FIG. 8.

In an alternative embodiment, as shown in FIGS. 8 and 9, the configuration article 212 could be configured such that relative movement between the readhead 4 and configuration article 212 (for instance by pulling the configuration article 212 in the direction illustrated by arrow A) is required in order for the readhead 4 to read all of the configuration data. This enables more data to be fit onto the configuration article. As also shown, an initiator block 214 could be provided which could be used to signal to the readhead 4 that what follows is configuration data. As shown, the initiator block 214 could comprise a feature of the same type as features encoding data, but be of a particular size. However, this need not be the case. For instance, the initiator block could comprise a feature of a different type, e.g. different reflectivity value, or comprise a plurality of features defining a predetermined initiator codeword. Although not shown, the configuration article 212 could be provided with a terminator block at the end of the configuration data. Like with the initiator block, the terminator block could be provided in one of many different forms.

With the embodiments of FIGS. 6 and 8 the features encoding the configuration data on the configuration article could be palindromic so that it is irrelevant which way around the configuration article is placed relative to the readhead 4.

The features encoding the configuration data on the configuration articles in the above described embodiments are formed as lines. However, it will be understood, that this need not necessary be the case. For instance, the features could be in the form of dots or other shaped features. Also, the features are arranged in a 1 dimensional manner. However, this need not be the case and for instance the configuration data could be encoded in a 2 dimensional array. In this case, preferably the image sensor 20 is a two dimensional image sensor, such as a 2 dimensional charge-coupled device (CCD).

Figure 10A:
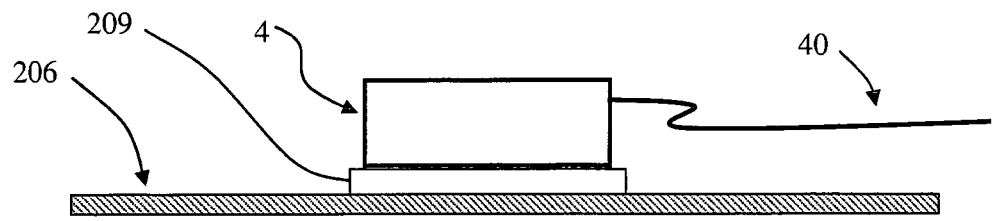
FIGS. 10a and 10b illustrate a particular embodiment of the invention in which the readhead is configured using a configuration item that is separate to the scale.
Figure 10B:
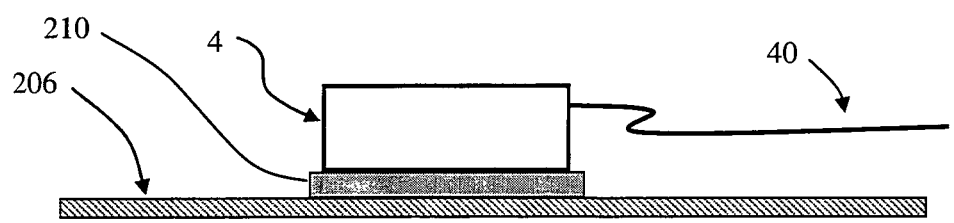

In a yet further embodiment as shown in FIGS. 10a and 10b, the configuration article could comprise an object having a particular attribute that is detectable by the readhead, e.g. a piece of material having a particular optical property. For instance, the first configuration article 209 shown in FIG. 10a has a high reflectively value whereas the second configuration article 210 shown in FIG. 10b has a low reflectivity value. On detection of the configuration article 209 having a high reflectivity value, the readhead 4 could be configured to operate in one manner (e.g. process the position signals in accordance with a first set of instructions or parameters), and on detection of the configuration article 210 having a low reflectivity value, the readhead 4 could be configured to operate in a second different manner (e.g. process the position signals in accordance with a second different set of instructions or parameters). Accordingly, rather than encoding the data in the form of a codeword, the data is encoded as a particular optical reflectivity property.

Figure 11:
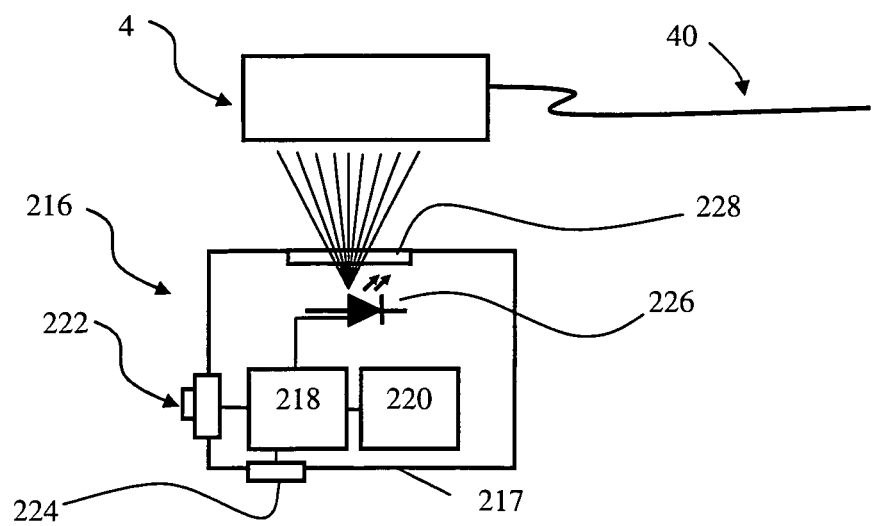
FIG. 11 illustrates a yet further embodiment of the invention in which the readhead is configured using a configuration item that is separate to the scale.

FIG. 11 shows another embodiment of a configuration article 216. In this case the configuration article 216 is an electronic device comprising a processor 218, memory 220, a switch 222, an interface 224, light emitting diode (LED) 226 and a window 228. The memory 220 stores configuration data which can be read by the processor 218. The processor 218 can then (for instance upon activation of the switch 222) control the LED to flash on and off in a sequence in accordance with the configuration data in order to transmit the configuration data to the readhead 4. The readhead 4 then detects the sequence of light flashes during the configuration process instead of reading lines. The configuration article 216 could be connected to an external device such as a computer via the interface 224 so that the configuration data on the memory can be changed if necessary.

Rather than using a programmable light source in order to reconfigure the readhead, the readhead could be reconfigured by a user manually shining a light source at the readhead in a predetermined manner. For instance, a user could operate a torch so as to expose the readhead to the torch's beam in a predetermined sequence in order to reconfigure the readhead.

In the above described embodiments the same detector arrangement is used to detect the scale's position features as well as the configuration item's features. However, this need not be the case. For instance, a separate detector arrangement could be provided in the readhead. The detector arrangement need not be of the same type as that used for the position features. For instance, as described above, the scale could comprise a series of markings of different reflectivities in order to encode the position information. The configuration item's markings could be encoded using, for instance, markings having different magnetic properties, such as different magnetic strength and/or polarities, or different capacitive or inductive properties. Accordingly, in addition to the optical detector arrangement, the readhead could also comprise a suitable magnetic, capacitive or inductive detector arrangement for detecting the configuration item's features.

As will be understood, the present invention enables the reconfiguration of how a readhead processes signals received from a scale. This can be useful in many situations, and in particular for instance if the readhead 4 could be used with a plurality of different types of scale. For example, if the readhead is to be used with rotary scales having different diameters, and/or is to be used with both rotary and linear scales, then the readhead could need re-configuring so that is knows how to properly process the signals in order to provide sensible position information. If the readhead 4 is to be used with a plurality of rotary scales of different diameters, then the readhead will likely need to know which size scale it is being used with as the angular position calculation which it outputs to the controller could depend on this. It can also, for instance, be beneficial to be able to reconfigure the readhead so that for a given scale it can be configured to select the output resolution depending on the controller's requirements.

A configuration item could be used in many ways in addition to, or alternatively to, reconfiguring the parameters a readhead uses to process position signals read from a scale. For instance, a configuration item could be used to change the mode of operation of the readhead. For example, on detection of a particular first type configuration item (such as that shown in FIG. 10a) the readhead could be configured to enter into a calibration mode in which the readhead could determine properties such as scale reflectivity, nominal scale period, signal strength, image distortion, and on detection of a particular second type configuration item (such as that shown in FIG. 10b) the readhead could be configured to exit the calibration mode (and for instance enter scale reading mode). Further examples of what a configuration item could be used for include configuring the data format output by the readhead, configuring the readhead's communication interface data rate, and/or configuring whether or not error warnings are enabled and if so then what types of error warning are available and their output format.

The invention claimed is:

1. A position encoder kit, comprising:
   a scale comprising a series of position features relating to position information; and
   a readhead comprising:
   a detector adapted to receive configuration information from a configuration item, the readhead being adapted to be configured in accordance with the configuration information, and
   a receiver interface, separate from the detector, via which the readhead can supply position information to a receiver.

2. A kit as claimed in claim 1, in which the readhead is adapted to process readings of the position features in accordance with the configuration information.

3. A kit as claimed in claim 1, in which the readhead is adapted to operate in one of a plurality of different modes of operation in accordance with the configuration information.

4. A kit as claimed in claim 3, in which the readhead has at least:
   a reading mode in which the readhead is adapted to read information from the scale, and
   a configuration mode that enables an external processor device to access a memory device in the readhead, via the receiver interface, so as to store and/or retrieve data stored in the memory device.

5. A kit as claimed in claim 1, further comprising a configuration item comprising the configuration information.

6. A kit as claimed in claim 5, in which the configuration item comprises an article comprising at least one attribute detectable by the detector, the detector encoding the configuration information.

7. A kit as claimed in claim 6, in which the scale comprises the configuration article.

8. A kit as claimed in claim 7, in which the series of position features and the configuration article are contained within a common track.

9. A kit as claimed in claim 8, in which the configuration article and the series of position features share at least one common feature.

10. A kit as claimed in claim 6, in which the configuration article and the scale are separate components.

11. A kit as claimed in claim 5, in which the configuration item comprises a configuration device operable to transmit wirelessly the configuration information.

12. A kit as claimed in claim 11, in which the configuration item comprises an optical transmitter operable to transmit optically the configuration information.

13. A kit as claimed in claim 11, in which the configuration device comprises at least one set of configuration data and is operable to selectively transmit the at least one set of configuration data to the readhead.

14. A kit as claimed in claim 1,
   in which the readhead has a reading face that, during reading of the series of position features, faces the series of position features, and
   in which the readhead is adapted to receive the configuration information via the reading face.

15. A kit as claimed in claim 14,
   in which the reading face comprises a reading region adjacent to which the series of position features must be located in order for the readhead to read the series of position features, and
   in which the readhead is adapted such that the configuration item must be positioned adjacent the reading region in order for the detector to detect the configuration information.

16. A kit as claimed in claim 15, in which the detector is also adapted to read the series of position features.

17. A readhead adapted to read, on a scale, position features relating to position information in order to facilitate relative position measurement between the readhead and the scale, the readhead comprising:
   a detector adapted to receive configuration information from a configuration item, the readhead being adapted to be configured in accordance with the configuration information, and
   a receiver interface, separate from the detector, via which the readhead can supply position information to a receiver.

18. A configuration item comprising configuration information adapted to configure a readhead in accordance with the configuration information.

19. A scale comprising:
   a series of position features relating to position information adapted to be read by a readhead to determine a position of the readhead relative to the scale, and
   configuration information adapted to configure the readhead in accordance with the configuration information.

20. A method of operating a readhead adapted to read position features on a scale, the method comprising:
   receiving configuration information from a configuration item by a detector of the readhead, the readhead being adapted to be configured in accordance with the configuration information,
   wherein the readhead comprises a receiver interface, separate to the detector, via which the readhead can supply position information to a receiver.

21. A position encoder kit, comprising:
   a scale comprising a series of position features relating to position information; and
   a readhead comprising:
      a detector adapted to receive configuration information from a configuration item, the readhead being adapted to be configured in accordance with the configuration information, and
      a reading face that, during reading of the series of position features, faces the series of position features, wherein the readhead is adapted to receive the configuration information via the reading face.

* * * * *